United States Patent
Uehara et al.

(10) Patent No.: US 6,776,956 B2
(45) Date of Patent: Aug. 17, 2004

(54) STEEL FOR SEPARATORS OF SOLID-OXIDE TYPE FUEL CELLS

(75) Inventors: Toshihiro Uehara, Yonago (JP); Akihiro Toji, Yasugi (JP); Takehiro Ohno, Nagoya (JP)

(73) Assignee: Hitachi Metals Ltd., Tokyo (JP)

( * ) Notice: Subject to any disclaimer, the term of this patent is extended or adjusted under 35 U.S.C. 154(b) by 0 days.

(21) Appl. No.: 10/132,571

(22) Filed: Apr. 26, 2002

(65) Prior Publication Data

US 2003/0063994 A1 Apr. 3, 2003

(30) Foreign Application Priority Data

Sep. 27, 2001 (JP) .......................... 2001-296528

(51) Int. Cl.$^7$ .............................................. C22C 38/18
(52) U.S. Cl. ........................ 420/40; 420/70; 148/325
(58) Field of Search ................. 420/40, 70; 148/325

(56) References Cited

U.S. PATENT DOCUMENTS

| | | |
|---|---|---|
| 4,726,853 A | 2/1988 | Gressin et al. |
| 6,086,689 A | 7/2000 | Sassoulas et al. |
| 6,294,131 B1 | 9/2001 | Jaffrey |

FOREIGN PATENT DOCUMENTS

| | | |
|---|---|---|
| EP | 0 678 587 A1 | 10/1995 |
| EP | 1 046 723 A1 | 10/2000 |
| EP | 1 113 084 A1 | 7/2001 |
| FR | 2 807 069 A1 | 10/2001 |
| JP | 6-264193 | 9/1994 |
| JP | 7-145454 | 6/1995 |
| JP | 7-166301 | 6/1995 |
| JP | 8-35042 | 2/1996 |
| JP | 8-277441 | 10/1996 |
| JP | 9-157801 | 6/1997 |
| JP | 10-280103 | 10/1998 |
| JP | 2000-294256 A | 10/2000 |

*Primary Examiner*—Deborah Yee
(74) *Attorney, Agent, or Firm*—Sughrue Mion, PLLC

(57) ABSTRACT

Provided is a steel for separators of solid-oxide type fuel cells, which forms oxide films having good electrical conductivity at 700 to 950° C. or so, has good oxidation resistance and, in particular, resistance to exfoliation even in the case of long hours of use, is excellent in impact properties at room temperature, shows a small difference in thermal expansion from the electrolyte, and is inexpensive. This steel for separators of solid-oxide fuel cells includes, by mass %, not more than 0.2% C, not more than 1.0% Si, not more than 1.0% Mn, not more than 2% Ni, 15 to 30% Cr, not more than 1% Al, one or more elements selected from the group of not more than 0.5% Y, not more than 0.2% REM and not more than 1% Zr, and the balance of Fe and unavoidable impurities. In this steel, amounts of S, O, N and B in the unavoidable impurities are restricted to not more than 0.015%, not more than 0.010%, not more than 0.050% and not more than 0.0050%, respectively, the following equation is satisfied:

$$(O+2S)/(0.27Y+0.035Zr+0.16REM) \leq 2.0,$$

Furthermore, in this steel, the hardness is not more than 280 HV and the average ferrite grain size number is not less than ASTM No. 2, which provides fine grains.

15 Claims, 4 Drawing Sheets

STEEL NO. 3 OF THE INVENTION

20μm

STEEL NO. 3 OF
THE INVENTION

20μm

STEEL NO. 5 OF
THE INVENTION

20μm (1) OXIDIZED FILM
(2) MATRIX

STEEL NO. 23 OF
THE INVENTION

20μm (1) OXIDIZED FILM
(2) MATRIX

COMPARATIVE STEEL NO. 37 ns from conventional levels from about 1000° C. to the range of 700 to 950° C. or so. Therefore, it is expected that practical application will be accelerated.

STEEL FOR SEPARATORS OF SOLID-OXIDE TYPE FUEL CELLS

BACKGROUND OF THE INVENTION

The present invention relates to a steel used in the separators of solid-oxide type fuel cells.

Because of their excellent features, such as high power generation efficiency, small emissions of SOx, NOx and $CO_2$, good response to load variations and compact size, fuel cells are expected to be used in a wide range of applications in power generation systems such as a large-scale centralized generation type, a decentralized generation type provided near cities, and an independent power plant type, as a substitute for thermal power generation.

Types of fuel cells are sorted according to the used electrolyte into the phosphoric acid type, the fused carbonate type, the solid-oxide type and the solid-polymer type. Among others, the solid-oxide type fuel cells use as the electrolyte thereof ceramics such as stabilized zirconia and have been operated at high temperatures near 1000° C.

The above solid-oxide type fuel cell is regarded to be very promising as the next-generation power supply source because it has excellent features as explained below. That is, because the solid-oxide type fuel cell is operated at high temperatures, it is unnecessary to use a catalyst for electrode reactions, the internal modification of fossil fuels by high temperatures being possible and various kinds of fuels such as coal gas being able to be used, the high-efficiency power generation being possible by a so-called combined-cycle power generation in which a combination with a gas turbine, steam turbine, etc. is adopted by utilizing high-temperature waste heat, and the solid-oxide fuel cell is compact because all components are solids.

However, there are still many problems to be examined in the practical application of the solid-oxide type fuel cell, and particularly in the case of a planar type fuel cell that permits a high output density, a separator is present as an important component.

This separator supports the three layers of electrolyte, anode and cathode, define gas passages, and at the same time causes electric currents to flow. Therefore, the separator is required to provide properties such as electrical conductivity at high temperatures, oxidation resistance, and a small difference in thermal expansion from the electrolyte and hence in consideration of such required properties, electrically conductive ceramics have been frequently used. However, because ceramics have inferior machinability and are expensive, there are problems in terms of large size design and practical application of fuel cells.

For this reason, the development of a separator made of a metallic material that is inexpensive and reliable is demanded. When a usual metallic material is used at 1000° C., the surface of the metallic material is oxidized and an oxide film is formed. However, when a metallic material is used as the material for the separator, it is necessary that this oxide film be stable so that oxidization does not proceed, and at the same time, it is necessary that the oxide film have an electrical conductivity.

In order to meet such required properties, in JP-A-6-264193 is proposed as the metallic material for solid-oxide type fuel cells an austenitic stainless steel that consists of not more than 0.1% C, 0.5 to 3.0% Si, not more than 3.0% Mn, 15 to 30% Cr, 20 to 60% Ni, 2.5 to 5.5% Al, and the balance of Fe.

Also, in JP-A-7-166301 is proposed as a separator of solid-electrolyte type fuel cells an alloy containing 60 to 82% Fe, 18 to 40% Cr, and additive elements that reduce the contact resistance between the above-described single cell and the cathode (La, Y, Ce or Al being singly added). Furthermore, in JP-A-7-145454 is proposed as a metallic material for solid-electrolyte type fuel cells a material that comprises 5 to 30% Cr, 3 to 45% Co, not more than 1% La, and the balance of Fe.

Recently, however, dramatic progress has been made in the improvement of solid-electrolyte type fuel cells and it has become possible to lower operating temperature from conventional levels from about 1000° C. to the range of 700 to 950° C. or so. Therefore, it is expected that practical application will be accelerated.

Because the material disclosed in JP-A-6-264193 contains considerable amounts of Al and Cr, the oxide film on the surface comprises Al-base oxides as the main composition and further contains Cr-base oxides. However, as is described below, because Al-base oxides have a low electrical conductivity, this material is not always sufficient for use in separators of solid-oxide type fuel cell, and besides because austenitic stainless steels have a larger coefficient of thermal expansion than the stabilized zirconia of electrolyte, they are apt to cause a deterioration of the performance of cells caused by the crack formation etc. of the electrolyte due to the heat cycles associated with the start and stop of cells, thus posing a problem in stability in the case of long time of use. In addition, because expensive Ni is contained in large amounts, the price is high and this is not sufficient for the practical application of fuel cells.

In contrast to this, the materials disclosed in JP-A-7-166301 and JP-A-7-145454 have lower values of coefficient of thermal expansion than the austenitic stainless steels and these values of coefficient of thermal expansion are close to that of the stabilized zirconia of electrolyte. Therefore, these materials are favorable in terms of stability in the case of long time of use and besides they have good electrical conductivity. However, the oxidation resistance after long time of use is insufficient, and particularly these materials promote the phenomenon of exfoliation associated with an increase in oxide films with the result that the grooves provided in the separator as gas passages in the cell are narrowed, thus posing the problem of a deterioration of the cell function.

Also, the materials disclosed in JP-A-8-35042 and JP-A-8-277441 have lower values of coefficient of thermal expansion than austenitic stainless steels, and these values are close to that of the stabilized zirconia of the electrolyte. Therefore, these materials are favorable in terms of stability in the case of long time of use. However, electrical conductivity, which is important as a property of a separator material, is not taken into consideration at all.

SUMMARY OF THE INVENTION

Also, the materials disclosed in JP-A-9-157801 and JP-A-10-280103 have low values of coefficient of thermal expansion up to 1000° C. and these values are close to that of the stabilized zirconia of electrolyte. Therefore, these materials are favorable in terms of stability in the case of long time of use and besides they have also good oxidation resistance at 1000° C. and have a good electrical conductivity.

However, the known materials described above were all developed to obtain good properties as separators of solid-oxide type fuel cells that operate at 1000° C. and the properties at the operating temperatures of recent solid-oxide type fuel cells of 700 to 950° C. or so are not taken into consideration at all.

Because the solid-oxide type fuel cells repeat operations and stops, stresses due to heat cycles act on the separator, which is a cell component. Because there is a fear of a failure of the separator due to thermal stresses especially in the case of low impact properties at room temperature, it is necessary for a steel for separators to have impact properties high enough to withstand thermal stresses. In the known materials, however, impact properties at room temperature are not taken into consideration at all.

The object of the invention is to provide a steel for separators of solid-oxide type fuel cells, which steel makes oxide films having good electrical conductivity at 700 to 950° C. or so, which steel has good oxidation resistance and, in particular, the resistance to exfoliation even in the case of long time of use, which steel is excellent in impact properties at room temperature, which steel is small in the difference of thermal expansion between the electrolyte and the steel, and which steel is inexpensive.

As a result of various examinations, the present inventors decided to use ferritic metallic materials. The first reason for this is as follows. That is, in view of the fact that the mean coefficient of thermal expansion of stabilized zirconia, which is the electrolyte of solid oxides, at room temperature to about 750° C. is about $11 \times 10^{-6}$/° C., whereas that of ordinary austenitic metallic materials is about $16 \times 10^{-6}$/° C., there being a great difference in thermal expansion between the two, the inventors have thought that there is a problem in stability in the case of long time of use.

The second reason is that in general, austenitic metallic materials contain expensive Ni and hence are expensive, whereas ferritic metallic materials comprise Fe as the base composition and do not contain Ni or contain only a small amount of Ni and, therefore, they are inexpensive.

Next, the inventors conducted various examinations as to the electrical conductivity of oxide films formed.

Oxides of Al and oxides of Cr are known as representative oxide films that have protective properties. At high temperatures of 700 to 950° C. or so, $Al_2O_3$ has generally a greater protective action and is favorable. However, when the electric resistance of materials on which $Al_2O_3$ films are formed was measured, the electric resistance value was very large and it became apparent that the materials on which $Al_2O_3$ films are formed cannot be used as separators.

On the other hand, it was found that materials on which $Cr_2O_3$ films are formed have sufficiently small electric resistance and hence can be used in separators. In the invention, therefore, it was decided to use ferritic metallic materials that make on their surfaces thereof oxide films comprising as the main component thereof Cr-base oxides, i.e., Fe-Cr-base materials.

Next, the oxidation resistance that poses a problem in the case of long time of use is explained. As explained above, at 700 to 950° C. or so, usually the oxidation resistance of the Cr-base oxide films is inferior to that of Al-base oxide films. Also, in the case where Cr-base oxide films are the main component, an Fe-base alloy (for example, Fe-Cr alloys represented by JIS-SUS 430) is inferior in oxidation resistance to an Ni-base alloy (for example, Ni-Cr alloys represented by JIS-NCF600).

Therefore, if an Fe-Cr-base material is used as the base composition following the above-described policy, it becomes very difficult to meet oxidation resistance.

The inventors have conducted various examinations to solve this problem and have found that, by adding to an Fe-Cr-base material one or more elements selected from the group consisting of Y, REM (Rare earth metal) and Zr, by suppressing the Al content to a low level, and further by adding Si and Mn by small amounts, it becomes possible to obtain a good oxidation resistance and, in particular, a good resistance to exfoliation although the steel has the Cr-base oxides as the main component of the films, so that the state of oxide films becomes stable even after long time of heating.

In particular, when Zr is added in combination to Y and/or rare-earth metals, the resistance to the exfoliation is most improved. Also, the inventors have found that even when each of the above-described elements is added, oxide films are mainly Cr-base oxide films and hence the electric resistance does not increase so much.

Furthermore, Y, rare-earth metals and Zr, which are effective in obtaining good oxidation resistance, are apt to become inclusions by the occurrence of sulfides and oxides when an alloy contains much amounts of S and O (oxygen). If Y, rare-earth metals and Zr become inclusions and are fixed, the amounts of Y, rare-earth metals and Zr that exist in a solid solution state in the matrix decrease, and their effective amounts decrease which are capable of contributing to the suppression of the growth of an oxide film, densification thereof and improvement of the adhesion thereof. Therefore, in order to ensure that added Y, rare-earth metals and Zr act effectively, it is effective to minimize the inclusions of these elements. Thus, the inventors have found that lowering the contents of impurities such as S and O (oxygen) is necessary for keeping the good oxidation resistance.

Furthermore, the inventors have found that, because N and B have also the fear of causing compounds by combining with a part of the elements such as, for example, La effective for keeping the oxidation resistance, it is effective to reduce these elements present as impurities to low amounts. Also, because the inventors have found that B in particular impairs the smoothness of the oxide film surface and reduces the contact resistance, it is necessary to suppress to a low level the amount of B contained in the steel for separators from the standpoint of the contact resistance.

Also, because Ti is an element that reduces oxidation resistance, it is also necessary to suppress to a low level the amount of Ti present as an impurity.

In working a steel as the material for separators to fabricate separators, it is necessary to reduce the hardness of the steel, and for this purpose it is necessary to perform appropriate annealing. This annealing is effective not only in hardness adjustment, but also in the adjustment of the ferrite grain size, and by ensuring an appropriate fine structure it is possible to improve also the impact properties.

As described above, the inventors have achieved the invention by optimizing heat treatment conditions, structure and mechanical properties while performing the adjustment of alloy components.

That is, in the first aspect of the invention, there is provided a steel for the separators of solid-oxide type fuel cells, which steel consists essentially, by mass, of not more than 0.2% C; not more than 1.0% Si exclusive of zero; not more than 1.0% Mn exclusive of zero; not more than 2% Ni; 15 to 30% Cr; not more than 1% Al; at least one kind selected from the group consisting of not more than 0.5% Y, not more than 0.2% rare earth elements (REM) and not more than 1% Zr; and the balance being Fe and incidental impurities including not more than 0.015% S, not more than 0.010% O (oxygen), not more than 0.050% N, and not more than 0.0030% B, the contents of the elements satisfying the formula (1) defined by $$(O\ (oxygen)+2S)/(0.27Y+0.035Zr+0.16REM) \leq 2.0 \qquad (1),$$

the steel having a hardness not more than 280 HV and fine grains of an average ferrite grain size number not less than ASTM No.2. In this formula (1), each of the atomic symbols means the amount of the element contained in the steel.

Further, in the second aspect of the invention, there is provided a steel for separators of solid-oxide type fuel cells, which steel consists essentially, by mass, of not more than 0.1% C; not more than 1.0% Si exclusive of zero; not more than 1.0% Mn exclusive of zero; not more than 1% Ni; 17 to 26% Cr; not less than 0.001 to less than 0.5% Al; 0.01 to 0.8% Zr; at least one kind selected from the group consisting of 0.01 to 0.3% Y, and 0.005 to 0.1% rare earth elements (REM); and the balance being Fe and incidental impurities including not more than 0.015% S, not more than 0.010% O (oxygen), not more than 0.020% N, and not more than 0.0030% B, the contents of the elements satisfying the formula (1) defined by $$(O\ (oxygen)+2S)/(0.27Y+0.035Zr+0.16REM) \leq 2.0 \qquad (1),$$

the steel having a hardness not more than 280 HV and fine grains of an average ferrite grain size number not less than ASTM No.2.

In the third aspect of the invention, there is provided a steel for separators of solid-oxide type fuel cells, which steel consists essentially, by mass, of not more than 0.1% C; less than 0.2% Si exclusive of zero; not more than 1.0% Mn exclusive of zero; not more than 1% Ni; 17 to 26% Cr; not less than 0.001 to less than 0.5% Al; 0.01 to 0.8% Zr; at least one kind selected from the group consisting of 0.01 to 0.3% Y, and 0.005 to 0.1% rare earth elements (REM); and the balance being Fe and incidental impurities including not more than 0.015% S, not more than 0.010% O (oxygen), not more than 0.020% N, and not more than 0.0030% B, the contents of the elements satisfying the formula (1) defined by $$(O\ (oxygen)+2S)/(0.27Y+0.035Zr+0.16REM) \leq 2.0 \qquad (1),$$

the steel having a hardness not more than 280 HV and fine grains of an average ferrite grain size number not less than ASTM No.2.

In the fourth aspect of the invention, there is provided a steel for separators of solid-oxide type fuel cells, which steel consists essentially, by mass, of not more than 0.1% C; less than 0.2% Si exclusive of zero; less than 0.2% Mn exclusive of zero; not more than 1% Ni; 17 to 26% Cr; not less than 0.001 to less than 0.5% Al; 0.01 to 0.8% Zr; at least one kind selected from the group consisting of 0.01 to 0.3% Y, and 0.005 to 0.1% rare earth elements (REM); and the balance being Fe and incidental impurities including not more than 0.015% S, not more than 0.010% O (oxygen), not more than 0.020% N, and not more than 0.0030% B, the contents of the elements satisfying the formula (1) defined by $$(O\ (oxygen)+2S)/(0.27Y+0.035Zr+0.16REM) \leq 2.0 \qquad (1),$$

the steel having a hardness not more than 280 HV and fine grains of an average ferrite grain size number not less than ASTM No.2.

In the fifth aspect of the invention, there is provided a steel for separators of solid-oxide type fuel cells, which steel consists essentially, by mass, of not more than 0.08% C; not more than 0.6% Si exclusive of zero; not more than 0.5% Mn exclusive of zero; not more than 0.5% Ni; 18 to 25% Cr; not less than 0.001 to less than 0.5% Al; 0.005 to 0.1% La, 0.01 to 0.6% Zr; and the balance being Fe and incidental impurities including not more than 0.1% Ti, not more than 0.008% S, not more than 0.008% O (oxygen), not more than 0.020% N, and not more than 0.0020 B, the contents of the elements satisfying the formula (2) defined by $$(O\ (oxygen)+2S)/(0.035Zr+0.16La) \leq 2.0 \qquad (2),$$

the steel having a hardness not more than 280 HV and fine grains of an average ferrite grain size number not less than ASTM No.2.

In a steel for separators of solid-oxide type fuel cells according to the invention, preferably, the B content is restricted to less than 0.0010%, the average ferrite grain size number is not less than ASTM No. 3, which provides fine grains, and the 2-mm V-notch Charpy impact value at 20° C. is not less than 10 J/cm².

Preferably, there is provided a steel for separators of solid-oxide type fuel cells, which steel further contains Mo alone or two kinds of Mo and W by an amount not more than 5.0% in terms of (Mo+½W).

More preferably, a steel for separators of solid-oxide type fuel cells according to the invention further contains at least one kind of 0.01 to 1.0 in total selected from the group consisting of V, Nb, Ta, and Hf.

More preferably, a steel for separators of solid-oxide type fuel cells according to the invention has a 2 mm-V notch Charpy impact value not less than 8 J/cm².

In a steel for separators of solid-oxide type fuel cells according to invention, more preferably, the electric resistance of an oxide film at 750° C. after heating at 750° C. for 1000 hours is not more than 100 mΩ·cm² and no exfoliation of surface oxide scale substantially occurs after further heating at 850° C. for 100 hours.

In a steel for separators of solid-oxide type fuel cells according to invention, also more preferably, the electric resistance of an oxide film at 750° C. after heating at 750°

C. for 1000 hours is not more than 50 mΩ·cm² and no exfoliation of surface oxide scale substantially occurs after further heating at 850° C. for 100 hours.

The reason for the restriction of the components of the invention is explained below.

Although C has the function of increasing the high-temperature strength by making carbides, this element deteriorates the workability and reduces the amount of Cr, which is effective for the oxidation resistance, by combining with Cr. Accordingly, the C content is restricted to be not more than 0.2%. The C content is preferably not more than 0.1% and more preferably not more than 0.08%.

Si participates in the making of the film, the main component of which is a Cr-base oxide layer, on the inner surface of the groove of a high-temperature passage provided in a separator, and even in the case of long time of use this element has the function of preventing the oxide film from growing in excess of necessity and from undergoing the exfoliation phenomenon.

It is thought that, as one of the effects of Si, this element improves the oxidation resistance by making a thin and discontinuous $SiO_2$ film probably near the interface defined between a $Cr_2O_3$ oxide film and the base metal.

Further, the above $SiO_2$ film produces, at the interface between the base metal and the $Cr_2O_3$ film, a state in which the base metal, $Cr_2O_3$ film and $SiO_2$ film are finely intertwined with each other, thereby increasing the adhesion to the base metal and being effective in preventing the exfoliation of the $Cr_2O_3$ film.

Although this effect is especially great at high temperatures of not less than 1000° C. and is not always great at 700 to 950° C., it is necessary to add a small amount of Si in order to obtain the above-described effect. On the other hand, excessive addition of Si causes a deterioration of workability and toughness and makes the $SiO_2$ film too thick and continuous, causing the exfoliation of the oxide film and causing the problem of a decrease in the electrical conductivity of the film. Accordingly, the Si content is, exclusive of zero, not more than 1.0%. A preferred Si content is, exclusive of zero, not more than 0.6%, and a more preferred Si content range is, exclusive of zero, less than 0.2%.

Mn, along with Fe and Cr, makes spinel-type oxides. A spinel-type oxide layer containing Mn is formed on the outside of a $Cr_2O_3$ oxide layer. This spinel-type oxide layer has the protective function of preventing Cr from evaporating from a steel for separators which evaporation deteriorates the ceramics electrolyte of solid-oxide type fuel cells. Furthermore, because the spinel-type oxides usually have a higher oxidation rate than $Cr_2O_3$, they have the functions of reducing contact resistance by keeping the smoothness of the oxidation film and of preventing the evaporation of Cr which evaporation is detrimental to the electrolyte, although they are unfavorable for oxidation resistance itself.

On the other hand, the excessive addition thereof deteriorates the resistance to oxidation because the spinel-type oxides containing Mn have insufficient oxidation resistance as described above. Accordingly, the Mn content is restricted to be, exclusive of zero, not more than 1.0%. When the use temperature is low to be from 700 to 950° C. or so, the Mn content may be, exclusive of zero, not more than 0.5%. At further lower use temperatures, the Mn content may be, exclusive of zero, less than 0.2%.

In the invention, Cr is an important element for keeping the good oxidation resistance and electrical conductivity both brought about by the existence of the $Cr_2O_3$ film. For this reason, the required Cr content is 15% at least. However, the excessive addition is not so effective in the improvement of oxidation resistance. On the contrary, the excessive addition thereof causes the deterioration of workability. Accordingly, the Cr content is restricted to be 15 to 30%. A preferred Cr content is 17 to 26% and a more preferred Cr content is 18 to 25%.

Y, REM and Zr have the effect of substantially improving the oxidation resistance and the electrical conductivity of the oxide film by the addition of a small amount. In particular, the improvement of the oxidation resistance becomes great especially when the addition of these elements is combined with the addition of small amounts of Si and Mn. It is thought that this is due mainly to the improvement of the adhesion of the oxide film.

In the invention, the oxidation resistance is imparted by the Cr-base oxide film alone. Adding Y, REM or Zr singly or in combination is indispensable for improving the adhesion of this Cr-base oxide film. However, because the excessive addition deteriorates hot workability, the contents of Y, REM and/or Zr is restricted to be not more than 0.5%, not more than 0.2% and not more than 1%, respectively. Preferably, the Y content is 0.01 to 0.3%, the REM content being 0.005 to 0.10%, and the Zr content is 0.01 to 0.8%.

Furthermore, by the combined addition of one or more elements selected from the group consisting of 0.01 to 0.3% Y and 0.005 to 0.10% REM with the addition of 0.01 to 0.8% Zr, the adhesion of the oxide film is further improved and the exfoliation of the oxide film can be prevented even after long time of heating. More preferably, 0.005 to 0.10% REM and 0.01% to 0.8% Zr are added in combination. Because La is most effective in improving the adhesion of the oxide film among all of the rare-earth metals, the combined addition of 0.005 to 0.10% La and 0.01 to 0.6% Zr is most preferred.

Incidentally, similarly to V, Nb, Ta and Hf, which are explained below, Zr combines with C to thereby make carbides, improves the workability by fixing C, and also contributes to the improvement of strength.

Ni is effective in improving toughness when it is added in a small amount to the steel of the invention. However, Ni is an austenite-forming element and excessive addition of Ni forms a ferrite-austenite binary-phase structure and results in an increase in the coefficient of thermal expansion and the cost increases. Furthermore, the excessive addition of Ni deteriorates the oxidation resistance. Accordingly, the Ni content is restricted to be not more than 2%. The Ni content is preferably not more than 1% and more preferably not more than 0.5%.

Al is usually added as a deoxidizer. Although an $Al_2O_3$ film is formed when Al is added in a large amount, and the $Al_2O_3$ film increases the electrical resistance of the oxide film although it is effective for improving the oxidation resistance. Accordingly, in the case of the invention, the Al content is restricted to be not more than 1% in order to prevent the $Al_2O_3$ film from occurring. Preferably, the Al content is not less than 0.001 to less than 0.5%.

Because Mo has the particular function of increasing high-temperature strength, this element may be added when it is important to obtain a high-temperature strength. Although W has an effect similar to that of Mo, W is needed to be added, in order to ensure that W brings about the same effect as Mo, in an amount twice, by mass %, as large as the Mo content. Because the addition of a large amount of W deteriorates the hot workability, it is necessary to suppress the total amount of Mo and W by adding W and Mo in combination.

Thus, since the excessive addition thereof deteriorates not only workability but also the oxidation resistance, the content of these two elements is restricted to be not more than 5% in terms of Mo+W/2. Preferably, the content of the two elements is not more than 3%.

V, Nb, Ta and Hf combine with C to thereby make carbides and improve the workability by fixing C. Although these elements contribute to an increase in strength, they make the oxides with the exception of Hf which oxides have not so good protective properties, thereby deteriorating the oxidation resistance.

Because Hf is also effective in improving the oxidation resistance, it is the most preferred elements of all. However, the addition of Hf is selected as required because this element is expensive. Furthermore, the excessive addition of V, Nb, Ta and Hf forms primary carbides in large amounts, thereby deteriorating the workability. Accordingly, in taking the workability, strength and oxidation resistance into consideration, V, Nb, Ta and Hf may be added singly or in combination in a total amount of 0.01 to 1.0%. Preferably, the total amount thereof is 0.03 to 0.6%.

Next, the reasons for the restriction of the incidental impurities causing a serious influence on the propeprties of the steel of the invention is explained below.

Because Ti deteriorates oxidation resistance by forming an internal oxidation phase, the amount of Ti is restricted, as one of the serious impurities, to be not more than 0.1%.

S causes sulfide-base inclusions by reacting with Mn, REM, etc. and lowers the content of rare-earth metals effective in improving the oxidation resistance, with the result that S deteriorates not only the oxidation resistance, but also the hot workability and impairs the steel surface. Accordingly, the amount of S is restricted to be not more than 0.015%. Preferably, the amount of S is not more than 0.008%.

O (oxygen) causes oxide-base inclusions by reacting with Al, Si, Mn, Cr, Y, REM, Zr and etc., and not only deteriorates the hot workability and cold workability, but also reduces the amounts of dissolved Y, REM, Zr, etc., which elements contribute greatly to the improvement in oxidation resistance, thereby reducing the oxidation resistance-improving effect of these elements. Accordingly, the O content is restricted to be not more than 0.010%. Preferably, the O content is not more than 0.008%.

N is an austenite-forming element. Therefore, in a case where N is excessively added to the ferritic Fe-Cr steel of the invention, it makes the austenite phase, thereby not only making it impossible to maintain a single phase of ferrite, but also impairs the hot and cold workability by forming nitride-base inclusions with Al, Cr, etc. Accordingly, the N content is restricted to be not more than 0.050%. Preferably, the N content is not more than 0.020% and more preferably not more than 0.010%.

B not only deteriorates the oxidation resistance by increasing the growth rate of the oxide film at high temperatures of not less than about 700° C., but also deteriorates the contact resistance by increasing the surface roughness of the oxide film, which increasing reduces the contact area between the oxide film and the electrode. Accordingly, the amount of B present as one of the serious impurities is restricted to be not more than 0.0030%, and it is preferred to minimize the B content to 0%. A preferred upper limit is not more than 0.0020% and more preferably, the amount of B is less than 0.0010%.

In order to ensure that, in the steel of the invention, Y, REM and Zr which are very effective in improving the oxidation resistance and the electrical conductivity of the oxide film, exert their effect to a sufficient degree, it is necessary that these elements are not completely fixed by the sulfide-base inclusions or oxide-based inclusions. In order to obtain this state, it is effective to suppress the ratios of the amounts of S and O to the contents of Y, Zr and REM into the low level as shown in equation (1).

In a case where the value of equation (1) exceeds 2.0, Y, Zr and REM are fixed by the inclusions, so that these elements do not contribute to the improvement in oxidation resistance and the electrical conductivity of the oxide film. Thus, the value of equation (1) is limited to be not more than 2.0. Incidentally, in making calculations, the value is set to be zero regarding any of the elements of Y, Zr and REM which is not added.

Incidentally, the following elements may be included in the steel of the invention within the following amounts:

$P \leq 0.04\%, Cu \leq 0.30\%, Mg \leq 0.02\%, Ca \leq 0.02\%$ and $Co \leq 2\%$ Next, in fabricating separators of solid-oxide type fuel cells from a steel of any of the above-described chemical composition, it is necessary to form gas passages by cold plastic working and machining. Therefore, it is necessary that the steel be highly capable of cold plastic working and machining and have an impact property high enough to prevent the occurrence of cracks in the steel which are apt to occur due to tensile stresses caused during the heat cycles.

In the invention, hardness, the grain size and impact properties are used as the indices of these required properties.

The hardness, grain size and impact properties, which are the required properties of the steel of the invention for the separators of solid-oxide type fuel cells, are not only determined by alloy compositions alone but also depend greatly on the method of plastic working of the material and the conditions of a heat treatment such as annealing, etc. Therefore, in order that a steel may be used as a steel for the separators of solid-oxide type fuel cells, it is important that not only chemical compositions, but also hardness, grain size, impact properties, etc. meet the ranges limited in the invention.

In order to meet the above-described hardness, grain size and impact properties, it is preferred to perform annealing to remove working strains that occur during the material manufacturing process and that remain in the material. When the annealing temperature is higher than 950° C., grains, which are described below, are coarsened. When the annealing temperature is lower than 650° C., the softening requires long hours. Furthermore, when the annealing is performed too long at a temperature lower than 650° C., the σ sigma phase occurs, so that there occurs such a possibility as the embrittlement is caused. Accordingly, an appropriate annealing temperature range is 650 to 950° C.

Incidentally, when the annealing is performed at a high temperature, it is preferred to perform the annealing for a short holding time. On the other hand, at a low temperature it takes long hours to reduce the hardness and, therefore, the holding time can be selected as required from the relationship between the grain size and the hardness.

When the hardness after annealing is higher than 280 HV, the working comes to require a long time and the shape accuracy decreases. Accordingly, the hardness is not more than 280 HV. Preferably, the hardness is not more than 200 HV. When the hardness is within this range, cold working such as cold rolling may be performed after annealing in order to modigy a deformation caused due to thermal strains after annealing.

The steel of the invention for the separators of solid-oxide type fuel cells is used at the use temperatures of not less than about 700° C. Because in the fuel cells there are repeated operations and stops, the steel for separators is subjected to a repetition of heat cycles of heating and cooling between the use temperatures and a room temperature. Especially because tensile stresses act during cooling, it is necessary only that the impact properties at room temperature are good in order to prevent the occurrence of cracks during cooling.

In order to obtain good impact properties in a steel of ferrite structure such as the steel of the invention for the separators of solid-oxide type fuel cells, it is effective to reduce the ferrite grain size. In order to obtain the impact properties described below, it is necessary that the average ferrite grain size number be not less than ASTM No. 2, which provides fine grains. Preferably, the average ferrite grain size number is not less than ASTM No. 3, which provides fine grains.

Impact properties can be evaluated by the 2-mm V-notch Charpy impact value at 20° C. Impact values of not less than 8 J/cm$^2$ are sufficient, and the impact value is preferably not less than 10 J/cm$^2$.

The steel of the invention for the separators of solid-oxide type fuel cells has excellent electrical resistance particularly in the temperature range of 700 to 950° C., and the index of this excellent electrical resistance is defined as explained below.

As an evaluation means of the electrical conductivity, it is important that the electrical conductivity of the oxide film at 750° C. after heating 750° C. for 1000 hours be not more than 100 mΩ·cm$^2$ and preferably be not more than 50 mΩ·cm$^2$.

Also, as an evaluation means of the phenomenon that the oxidation of the Cr-base oxide film proceeds with the result that the Cr-base oxide film becomes oxide scale and exfoliates, it is important that after heating at 850° C. for 100 hours, the exfoliation of the surface oxide scale not substantially occur. Incidentally, "no exfoliation of surface oxide scale substantially occurs" means that no natural exfoliation of scale occurs in a state where no external impact is applied.

Also, the steel of the invention is a material suitable for the separators of solid-oxide type fuel cells and is often worked into steel sheets and steel strips. However, it is also possible to work this steel in various forms such as steel bar, wire rod, powder, sintered powder material, porous material and steel foil, for use in other parts of solid-oxide fuel cells and parts for other applications in which the characteristics of the steel of the invention can be utilized.

Figure 1:
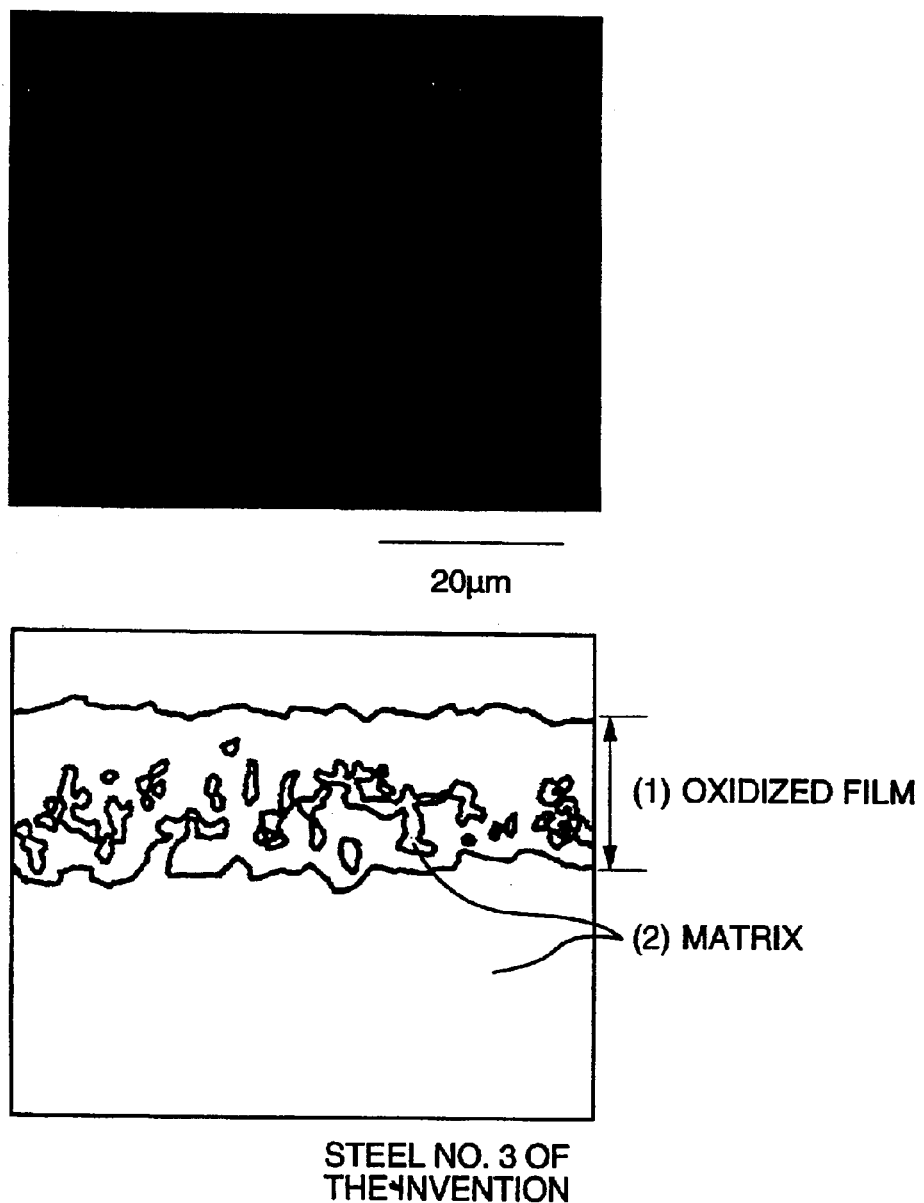
FIG. 1 is a sectional micrograph of a steel for the separators of solid-oxide type fuel cells of the invention.

DESCRIPTIONS OF PREFERRED
EMBODIMENTS OF THE INVENTION

EXAMPLE 1

Steels embodying the invention and comparative alloys were produced in a vacuum induction furnace and were cast into 10-kg ingots.

During vacuum melting, high-purity materials were used in order to make impurity elements be within specified contents and the mixing and remaining of Ti, S, O, N, B, etc. were suppressed by controlling operating conditions such as furnace atmosphere. However, for part of the comparative alloys, these means were not taken into consideration in order to investigate the effect of impurities.

After that, the ingots were heated to 1100° C., forged into square bars each having a side of 30 mm in length, and annealed at 780° C. for 1 hour. Table 1 shows the chemical compositions of the steel Nos. 1 to 23 of the inventions and comparative alloys Nos. 31 to 40. Incidentally, the comparative alloy No. 40 in Table 1 is an austenitic alloy known as JIS-NCF600.

TABLE 1

(mass %)

| No. | C | Si | Mn | Ni | Cr | Al | Zr | Y | REM | Ti | S | O | N | B | Others | Fe | Value of formula (1) | Remarks |
|---|---|---|---|---|---|---|---|---|---|---|---|---|---|---|---|---|---|---|
| 1 | 0.020 | 0.43 | 0.48 | 0.39 | 21.6 | 0.17 | 0.16 | — | La = 0.02 | <0.01 | 0.001 | 0.0041 | 0.0057 | <0.0001 | | bal. | 0.69 | Steel of the invention |
| 2 | 0.022 | 0.27 | 0.36 | 0.14 | 21.8 | 0.14 | 0.31 | — | La = 0.04 | <0.01 | 0.002 | 0.0047 | 0.0054 | <0.0001 | | bal. | 0.50 | " |
| 3 | 0.019 | 0.40 | 0.45 | 0.26 | 22.1 | 0.21 | 0.22 | — | La = 0.03 | <0.01 | 0.003 | 0.0034 | 0.0041 | <0.0001 | | bal. | 0.75 | " |
| 4 | 0.023 | 0.17 | 0.18 | 0.31 | 22.2 | 0.22 | 0.14 | — | La = 0.02 | 0.02 | 0.002 | 0.0039 | 0.0053 | <0.0001 | | bal. | 0.98 | " |
| 5 | 0.014 | 0.08 | 0.47 | 0.23 | 21.7 | 0.19 | 0.13 | — | La = 0.04 | 0.01 | 0.001 | 0.0058 | 0.0068 | <0.0001 | | bal. | 0.71 | " |
| 6 | 0.021 | 0.37 | 0.41 | 0.21 | 22.8 | 0.16 | 0.26 | — | La = 0.03 | 0.02 | 0.002 | 0.0014 | 0.0027 | <0.0001 | | bal. | 0.39 | " |
| 7 | 0.023 | 0.38 | 0.13 | 0.19 | 22.3 | 0.20 | 0.29 | — | La = 0.04 | <0.01 | 0.003 | 0.0088 | 0.0136 | 0.0001 | | bal. | 0.89 | " |
| 8 | 0.017 | 0.44 | 0.46 | 0.24 | 22.9 | 0.22 | 0.24 | — | Ce = 0.04 | 0.02 | 0.002 | 0.0037 | 0.0048 | 0.0003 | | bal. | 0.52 | " |
| 9 | 0.009 | 0.22 | 0.24 | 0.11 | 21.3 | 0.24 | 0.27 | 0.008 | La = 0.03 | <0.01 | 0.003 | 0.0029 | 0.0055 | <0.0001 | | bal. | 0.25 | " |
| 10 | 0.013 | 0.36 | 0.43 | 0.20 | 22.4 | 0.17 | — | — | La = 0.04 | <0.01 | 0.002 | 0.0042 | 0.0051 | <0.0001 | | bal. | 1.28 | " |
| 11 | 0.021 | 0.47 | 0.49 | 0.33 | 24.1 | 0.35 | 0.09 | 0.04 | La = 0.03 | <0.01 | 0.003 | 0.0036 | 0.0024 | <0.0001 | | bal. | 0.41 | " |
| 12 | 0.018 | 0.39 | 0.53 | 0.23 | 20.2 | 0.11 | 0.13 | — | La = 0.04 | 0.02 | 0.003 | 0.0022 | 0.0039 | <0.0001 | | bal. | 0.75 | " |
| 13 | 0.019 | 0.45 | 0.42 | 0.09 | 21.5 | 0.02 | 0.21 | — | Ce = 0.03 | <0.01 | 0.001 | 0.0029 | 0.0046 | <0.0001 | | bal. | 0.40 | " |
| 14 | 0.023 | 0.28 | 0.54 | 0.14 | 22.1 | 0.18 | 0.26 | — | La = 0.02 | 0.02 | 0.002 | 0.0044 | 0.0058 | <0.0001 | | bal. | 0.68 | " |
| 15 | 0.022 | 0.51 | 0.55 | 0.19 | 22.4 | 0.03 | 0.22 | — | La = 0.03 | 0.01 | 0.001 | 0.0018 | 0.0034 | <0.0001 | Mo = 1.5 | bal. | 0.30 | " |
| 16 | 0.015 | 0.33 | 0.42 | 0.07 | 21.9 | 0.16 | 0.18 | — | Ce = 0.04 | 0.01 | 0.002 | 0.0042 | 0.0057 | <0.0001 | Mo = 1.1 | bal. | 0.65 | " |
| 17 | 0.019 | 0.32 | 0.39 | 0.16 | 22.3 | 0.15 | 0.24 | — | La = 0.03 | 0.02 | 0.003 | 0.0028 | 0.0044 | <0.0001 | W = 0.4 | bal. | 0.55 | " |
| 18 | 0.024 | 0.12 | 0.34 | 0.32 | 21.1 | 0.24 | 0.28 | 0.01 | Nd = 0.03 | 0.02 | 0.001 | 0.0034 | 0.0038 | <0.0001 | Nb = 0.1 | bal. | 0.37 | " |
| 19 | 0.023 | 0.41 | 0.29 | 0.27 | 21.9 | 0.14 | 0.17 | — | La = 0.02 | 0.01 | 0.002 | 0.0022 | 0.0036 | <0.0001 | V = 0.2 | bal. | 0.34 | " |
| 20 | 0.025 | 0.05 | 0.23 | 0.21 | 22.2 | 0.16 | 0.21 | — | La = 0.03 | <0.01 | 0.001 | 0.0027 | 0.0042 | <0.0001 | Ta = 0.09 | bal. | 0.39 | " |
| 21 | 0.022 | 0.06 | 0.17 | 0.19 | 22.4 | 0.09 | 0.19 | — | Ce = 0.02 | 0.01 | 0.002 | 0.0036 | 0.0064 | <0.0001 | Hf = 0.04 | bal. | 0.58 | " |
| 22 | 0.026 | 0.12 | 0.24 | 0.18 | 22.9 | 0.16 | 0.23 | — | La = 0.04 | <0.01 | 0.001 | 0.0025 | 0.0052 | <0.001 | | bal. | 0.40 | " |
| 23 | 0.021 | 0.01 | 0.02 | 0.23 | 21.3 | 0.21 | 0.26 | — | La = 0.02 | <0.01 | 0.002 | 0.0031 | 0.0047 | <0.0001 | | bal. | 0.51 | " |
| 31 | 0.029 | 0.42 | 0.54 | 0.04 | 12.3 | 0.12 | 0.24 | — | La = 0.03 | 0.01 | 0.002 | 0.0046 | 0.0073 | <0.0001 | | bal. | 0.65 | Comparative steel |
| 32 | 0.019 | 0.18 | 0.27 | 0.25 | 31.4 | 0.23 | 0.18 | — | La = 0.03 | 0.02 | 0.001 | 0.0039 | 0.0045 | <0.0001 | | bal. | 0.94 | " |
| 33 | 0.017 | 0.26 | 0.52 | 0.26 | 20.1 | 3.67 | — | — | — | 0.01 | 0.002 | 0.0018 | 0.0038 | <0.0001 | | bal. | — | " |
| 34 | 0.018 | 3.26 | 0.41 | 0.10 | 19.6 | 0.24 | 0.12 | — | La = 0.02 | 0.02 | 0.002 | 0.0042 | 0.0053 | <0.0001 | | bal. | 1.11 | " |
| 35 | 0.024 | 0.38 | 0.43 | 0.24 | 22.7 | 0.21 | 0.05 | — | La = 0.04 | 0.03 | 0.001 | 0.0128 | 0.0247 | <0.0001 | | bal. | 2.99 | " |
| 36 | 0.026 | 0.24 | 0.39 | 0.17 | 22.8 | 0.10 | 0.11 | — | La = 0.01 | 0.01 | 0.001 | 0.0092 | 0.0136 | <0.0001 | | bal. | 2.06 | " |
| 37 | 0.023 | 0.32 | 0.45 | 0.22 | 21.4 | 0.23 | 0.17 | — | La = 0.03 | 0.02 | 0.003 | 0.0051 | 0.0067 | 0.0096 | | bal. | 1.03 | " |
| 38 | 0.021 | 0.34 | 0.42 | 0.19 | 22.1 | 0.22 | 0.16 | — | La = 0.03 | 0.02 | 0.028 | 0.0038 | 0.0046 | <0.0001 | | bal. | 5.75 | " |
| 39 | 0.024 | 0.36 | 0.48 | 0.21 | 22.7 | 0.14 | — | — | La = 0.01 | 0.83 | 0.002 | 0.0036 | 0.0068 | <0.0001 | | bal. | 4.75 | " |
| 40 | 0.029 | 0.24 | 0.32 | bal. | 16.4 | 0.19 | — | — | — | 0.2 | 0.002 | 0.0013 | 0.0027 | <0.0001 | | 8.5 | — | " |

(Note 1): The mark "—" means no addition of the element.
(Note 2): The amount "<0.0001" regarding the amount of B is the limit of the detection.

Specimens were cut from these materials and various tests were performed.

First, the structures of the longitudinal sections of the steels of the invention and comparative alloys were observed with an optical microscope and the average ferrite grain size number was measured. Also, 2-mm V-notch Charpy test specimens were taken and the 2-mm V-notch Charpy test was performed at 20° C. to evaluate the impact values. Further, by use of columnar specimens 10 mm in diameter and 20 mm in length, a heat treatment was performed in air at 850° C. for 100h and at 750° C. for 1000 hours and after that, the amount of the exfoliated surface oxide scale was measured.

Further, by use of plate-like specimens 10 mm in width, 10 mm in length and 3 mm in thickness, oxide films were provided on the steel surfaces by performing a heat treatment in the air at 750° C. for 1000 hours and after that, electrical resistance at 750° C. was measured. The electrical resistance was expressed by area resistivity (mΩ·cm$^2$).

Also, the average coefficient of the thermal expansion at 30 to 750° C. was measured. These test results are shown in Table 2.

As shown in Table 2, in each of the steel of the inventions, the hardness after annealing is not more than 280 HV, the average ferrite grain size number being not less than ASTM No. 2, and the 2-mm V-notch Charpy impact value is not less than 8 J/cm$^2$.

As shown in Table 2, in the steel of the inventions, no exfoliation of scale after heating in the air at 750° C. for 1000 hours and at 850° C. for 100 hours is observed.

Also, in the steel of the inventions, the values of the electric resistance measured at 750° C. after making the oxide films on the steel surfaces by heating at 750° C. for 1000 hours were sufficiently small. It is thought that this is because thin and dense $Cr_2O_3$ films are made mainly on the surfaces.

In addition, in the steels of the invention, the values of the mean coefficient of thermal expansion at 30 to 750° C. are in the range of about $11 \times 10^{-6}/°$ C. and small. These values are close to that of stabilized zirconia which is a solid electrolyte.

On the other hand, it is apparent that the comparative alloy No. 31, in which the exfoliated amount is large due to a low Cr content, cannot endure long hours of use. In the comparative alloy No. 32, no scale exfoliation is observed at 750° C. because of a high Cr content, whereas the exfoliation of a small amount of scale is observed at 850° C.

In the comparative alloy No. 33, which contains not less than 3% Al, an $Al_2O_3$ film is made and the value of electrical resistance becomes much larger than those of the steels of

TABLE 2

| No. | Hardness HV | Ferrite grain size No. | Charpy impact value (J/cm$^2$) | After heating at 750° C. 1000 hours | | Amount of exfoliation of scale after heating at 850° C. for 100 hours (mg/cm$^2$) | Average thermal expansion coeffiecient (30~750° C.) (×10$^{-6}$/° C.) | Remarks |
|---|---|---|---|---|---|---|---|---|
| | | | | Amount of expoliation of scale (mg/cm$^2$) | Electric resistance at 750° C. (mΩ · cm$^2$) | | | |
| 1 | 152 | 2 | 8.3 | 0 | 18 | 0 | 11.5 | Steel of the invention |
| 2 | 154 | 3 | 11.2 | 0 | 13 | 0 | 11.6 | " |
| 3 | 167 | 4 | 14.8 | 0 | 16 | 0 | 11.6 | " |
| 4 | 153 | 2 | 9.7 | 0 | 14 | 0 | 11.5 | " |
| 5 | 155 | 3 | 10.8 | 0 | 15 | 0 | 11.6 | " |
| 6 | 157 | 3 | 11.0 | 0 | 17 | 0 | 11.6 | " |
| 7 | 151 | 2 | 8.5 | 0 | 17 | 0 | 11.5 | " |
| 8 | 164 | 4 | 13.4 | 0 | 20 | 0 | 11.5 | " |
| 9 | 153 | 2 | 8.2 | 0 | 16 | 0 | 11.6 | " |
| 10 | 158 | 3 | 10.9 | 0 | 22 | 0 | 11.5 | " |
| 11 | 157 | 3 | 10.8 | 0 | 15 | 0 | 11.2 | " |
| 12 | 150 | 2 | 9.3 | 0 | 16 | 0 | 11.6 | " |
| 13 | 166 | 4 | 13.7 | 0 | 21 | 0 | 11.6 | " |
| 14 | 169 | 4 | 13.6 | 0 | 23 | 0 | 11.5 | " |
| 15 | 159 | 4 | 12.8 | 0 | 24 | 0 | 11.4 | " |
| 16 | 153 | 3 | 11.2 | 0 | 26 | 0 | 11.5 | " |
| 17 | 163 | 4 | 12.4 | 0 | 19 | 0 | 11.5 | " |
| 18 | 165 | 4 | 13.1 | 0 | 14 | 0 | 11.6 | " |
| 19 | 151 | 2 | 8.8 | 0 | 13 | 0 | 11.6 | " |
| 20 | 153 | 2 | 8.4 | 0 | 15 | 0 | 11.5 | " |
| 20 | 153 | 2 | 8.4 | 0 | 15 | 0 | 11.5 | " |
| 21 | 160 | 3 | 9.3 | 0 | 16 | 0 | 11.4 | " |
| 22 | 152 | 2 | 8.2 | 0 | 14 | 0 | 11.4 | " |
| 23 | 154 | 2 | 8.5 | 0 | 12 | 0 | 11.3 | " |
| 31 | 132 | — | — | 0.19 | 54 | 0.54 | 11.7 | Comparative steel |
| 32 | 186 | — | — | 0 | 58 | 0.12 | 11.0 | " |
| 33 | 154 | — | — | 0 | 286 | 0 | 13.1 | " |
| 34 | 172 | — | — | 0 | 103 | 0 | 11.4 | " |
| 35 | 154 | — | — | 0.07 | 49 | 0.22 | 11.6 | " |
| 36 | 160 | — | — | 0.04 | 42 | 0.16 | 11.6 | " |
| 37 | 156 | — | — | 0.09 | 51 | 0.28 | 11.5 | " |
| 38 | 155 | — | — | 0.11 | 68 | 0.34 | 11.5 | " |
| 39 | 162 | — | — | 0.10 | 63 | 0.31 | 11.6 | " |
| 40 | 153 | — | — | 0 | 11 | 0 | 15.9 | " | the invention. In the comparative alloy No. 34, the Si content is high and it seems that a thick SiO$_2$ film is made because the value of electrical resistance is high.

In the comparative alloys Nos. 35 and 36, due to the high amount of O (oxygen) and the low amounts of Zr, Y and REM, the value of equation (1) is large and the effects of Zr, Y and REM, which are effective in improving oxidation resistance, cannot be fully brought about. Therefore, the scale exfoliation is observed and the electrical resistance is also high.

Because the comparative alloy No. 37 contains a much amount of B, no dense oxidation scale is made and the scale is partially exfoliated. At the same time, the electrical resistance is also high. Furthermore, because the comparative alloy No. 38 contains a much amount of S, the value of equation (1) becomes large and the effects of REM, etc., which are effective in improving oxidation resistance, cannot be fully brought about. Therefore, the scale exfoliation is observed and the electrical resistance is also high.

Because the comparative alloy No. 39 contains a much amount of Ti and, for this reason, the value of equation (1) is large. Therefore, the scale exfoliation is observed and the electrical resistance is also high. In the comparative alloy No. 40, no exfoliation of oxide scale is observed and the electric resistance is low. However, because this alloy is an austenitic Ni-base alloy, the coefficient of the thermal expansion is very large.

In FIGS. 1 to 4 are shown the sectional micrographs and schematic illustrations of the oxidation films obtained after the heating at 1000° C. for 100 hours regarding the steels Nos. 3, 5 and 23 of the invention and the comparative alloy No. 37 containing B.

Figure 2:
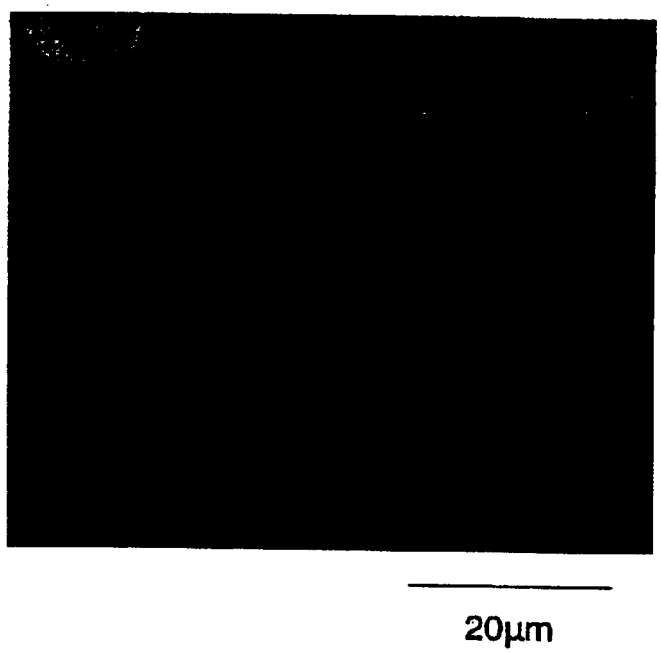
FIG. 2 is a sectional micrograph of a steel for the separators of solid-oxide type fuel cells of the invention.
Figure 2:
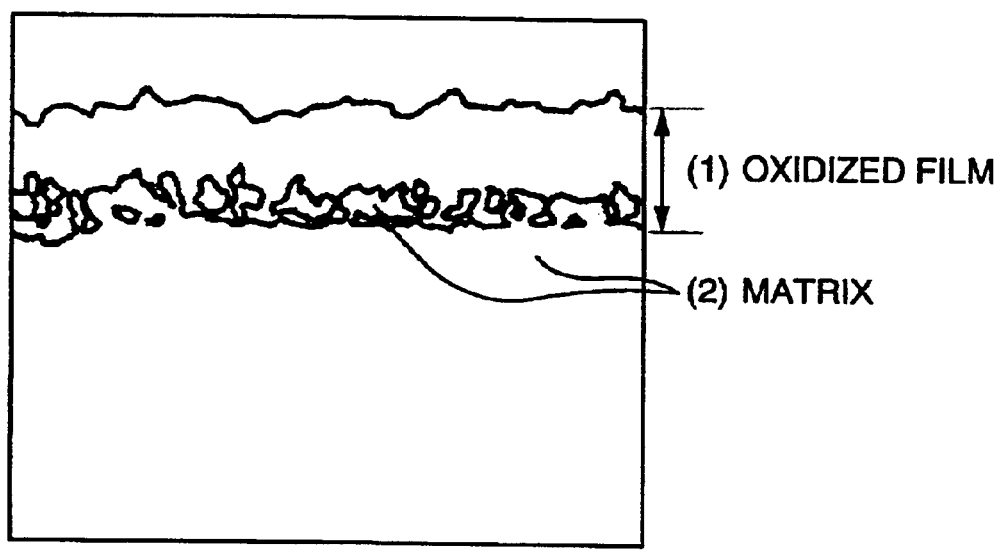
Figure 3:
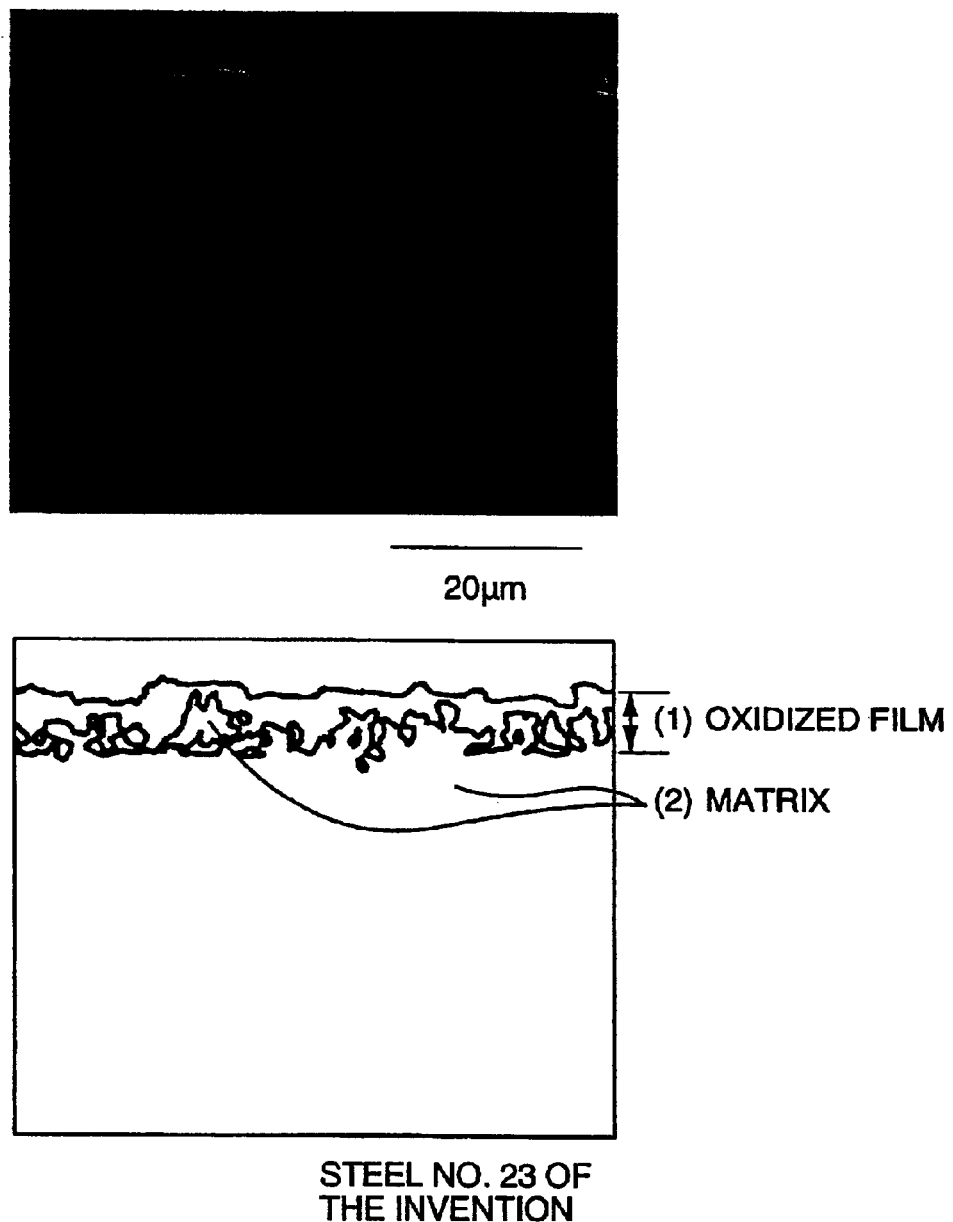
FIG. 3 is a sectional micrograph of a steel for the separators of solid-oxide type fuel cells of the invention.
Figure 4:
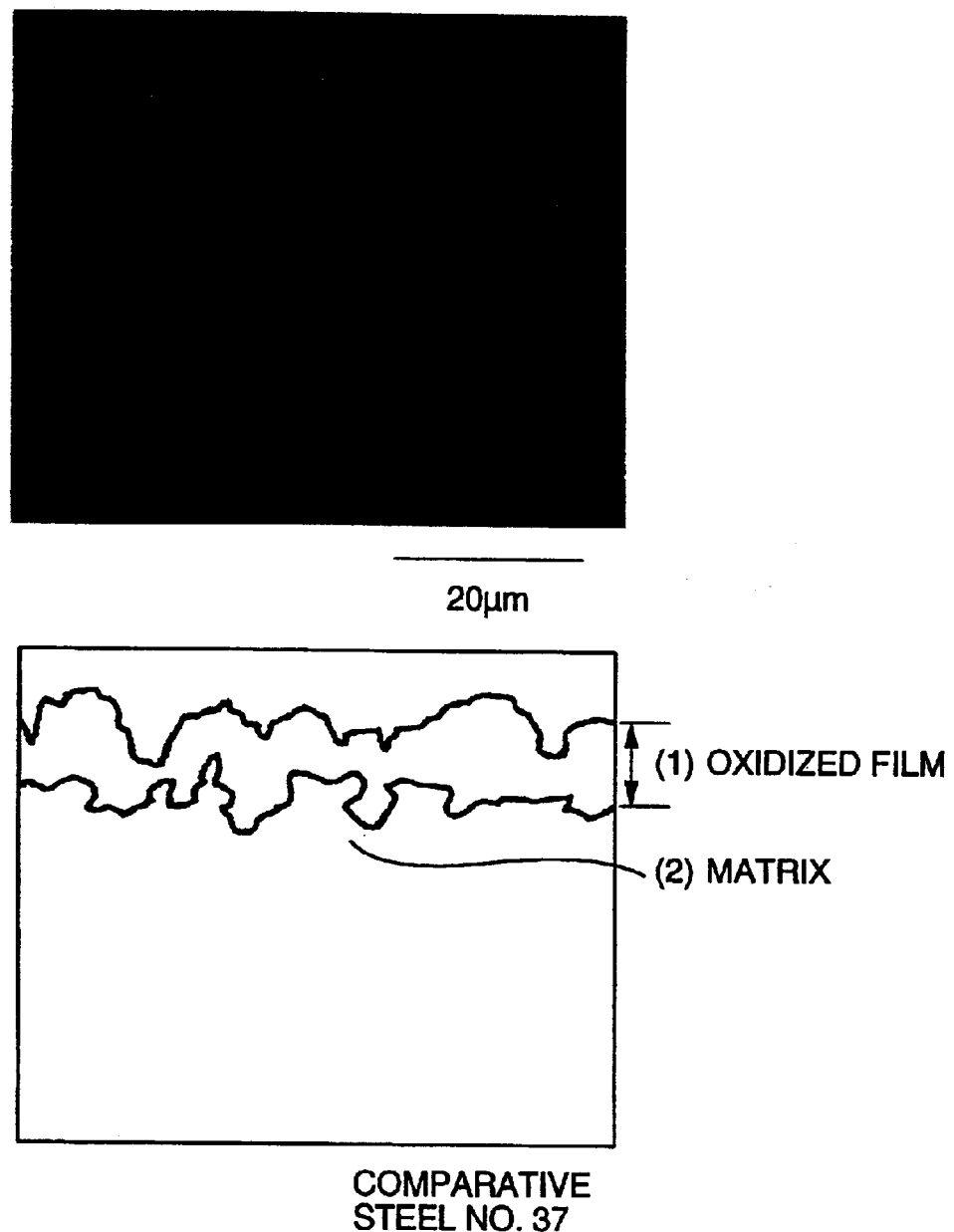
FIG. 4 is a sectional micrograph of a comparative alloy.

As shown in FIGS. 1 to 3, in the steel of the inventions, the surface of the oxide film (1) is smooth and the matrix (2) protrudes into the oxide film. Therefore, the adhesion of the oxide film is good. In contrast, the surface of the oxide film (1) of the comparative alloy No. 37 containing B as shown in FIG. 4 shows great irregularities and is not smooth. In addition, it is apparent that the matrix (2) does not protrude into the oxide film. For this reason, it is thought that in the comparative alloy containing B, not only contact resistance is high, but also the adhesion of the oxide film is not good. Therefore, it is important to minimize the amount of B prsent as one of the serious impurities.

EXAMPLE 2

For the steels Nos. 1 to 5 of the invention, after hot forging, ingots were finished by hot rolling into plates with a thickness of 5 mm, which were annealed at 780° C. for 1 hour. These plates were further finished into sheets of 1 mm and 0.3 mm in thickness by repeating cold working and annealing, and these sheets were further annealed at 850° C. for 3 minutes and 2 minutes, respectively. The microstructures of these steel sheets were observed with an optical microscope and the grain size was measured.

Also, for forged materials with a side of 30 mm and hot rolled materials with a thickness of 5 mm, the 2-mm V-notch Charpy impact test was performed at 20° C. and the impact values were measured.

These results are collectively shown in Table 3.

TABLE 3

| Steel No. | Thickness | Annealing condition | Hardness, HV | Ferrite grain size No. | Charpy impact value (J/cm$^2$) |
|---|---|---|---|---|---|
| 1 | 5 mm | 780° C. × 1 hour | 157 | 5 | 18.2 |
| 2 | 5 mm | 780° C. × 1 hour | 158 | 6 | 21.6 |
| 3 | 5 mm | 780° C. × 1 hour | 158 | 6 | 20.1 |
| 4 | 5 mm | 780° C. × 1 hour | 156 | 6 | 23.2 |
| 5 | 5 mm | 780° C. × 1 hour | 157 | 5 | 16.9 |
| 1 | 1 mm | 850° C. × 3 minutes | 163 | 8 | — |
| 2 | 1 mm | 850° C. × 3 minutes | 164 | 9 | — |
| 3 | 1 mm | 850° C. × 3 minutes | 163 | 9 | — |
| 4 | 1 mm | 850° C. × 3 minutes | 162 | 8 | — |
| 5 | 1 mm | 850° C. × 3 minutes | 163 | 8 | — |
| 1 | 0.3 mm | 850° C. × 2 minutes | 170 | 8 | — |
| 2 | 0.3 mm | 850° C. × 2 minutes | 172 | 10 | — |
| 3 | 0.3 mm | 850° C. × 2 minutes | 168 | 9 | — |
| 4 | 0.3 mm | 850° C. × 2 minutes | 169 | 9 | — |
| 5 | 0.3 mm | 850° C. × 2 minutes | 168 | 9 | — |

In each of these steels, the hardness is not more than 280 HV and the average ferrite grain size number is not less than ASTM No. 3. In particular, in the plate materials of 1 mm and 0.3 mm in thickness, which were produced while using the cold rolling process, the average ferrite grain sizes number are ASTM Nos. 8 and 9 and Nos. 9 and 10 or so, respectively, and grains are very fine in size. Furthermore, the 2-mm V-notch Charpy impact value of the 5-mm thick samples is not less than 10 J/cm$^2$ and impact properties are also good.

As described above, by using the steel of the invention for the separators of solid-oxide type fuel cells, it is possible to make the oxide film having good electrical conductivity at 700 to 950° C. or so, and at the same time, it is possible to ensure the good oxidation resistance and, particularly, the resistance to exfoliation even in the case of long hours of use, and a small difference in thermal expansion from the electrolyte, to reduce the cost of fuel cells, and to improve the performance of the fuel cells. Therefore, the steel of the invention can contribute greatly in the practical application of the solid-oxide fuel cells that operate at relatively low temperatures of 700 to 950° C. or so, in improving the efficiency of these fuel cells, and in the large size design thereof.

What is claimed is:

1. A steel as annealed for a separator of a solid oxide fuel cell, consisting essentially of, by mass:

not more than 0.2% C; from more than zero to less than 0.2% Si; from more than zero to not more than 1.0% Mn; 15 to 30% Cr; not more than 2% Ni; not more than 1% Al; 0.005 to 0.1% La; not more than 1% Zr; and the balance being Fe and incidental impurities including not more than 0.1% Ti, not more than 0.015% 5, not more than 0.010% O (oxygen), not more than 0.050% N (nitrogen), and not more than 0.0030% B, the contents of said elements satisfying the formula (1) defined by;

$$(O \text{ (oxygen)} + 2S)/(0.27Y + 0.035Zr + 0.16REM) \leq 2.0 \qquad 1),$$

wherein REM is the content of rare earth metals, and wherein said steel has a hardness not more than 280 HV and fine grains of an average ferrite grain size number not less than ASTM No.2.

2. A steel as annealed for a separator of a solid oxide type fuel cell, consisting essentially of, by mass:

not more than 0.1% C; from more than zero to less than 2.0% Si; from more than zero to not more than 1.0% Mn; 17 to 26% Cr; not more than 1 % Ni; not less than 0.001 to less than 0.5% Al; 0.01 to 0.8% Zr; 0.005 to 0.1% La; and the balance being Fe and incidental impurities including nor more than 0.1% Ti, not more than 0.015% S, not more than 0.010% O (oxygen), not more than 0.020% N (nitrogen), and not more than 0.0030% B, the contents of said elements satisfying the formula (1) defined by $$(O\ (oxygen)+2S)/(0.27Y+0.035Zr+0.16REM) \leq 2.0 \qquad 1),$$

wherein REM is the content of rare earth metals, and wherein said steel has a hardness not more than 280 HV and fine grains of an average ferrite grain size number not less than ASTM No.2.

3. A steel as annealed for a separator of a solid oxide type fuel cell, consisting essentially of, by mass;

not more than 0.1% C; from more than zero to not more than 0.17% Si; from more than zero to not more than 1.0% Mn; 17 to 26% Cr; not more than 1% Ni; not less than 0.001 to less than 0.5% Al; 0.01 to 0.8% Zr; 0.005 to 0.1% La; and the balance being Fe and incidental impurities including not more than 0.02% Ti, not more than 0.015% S, not more than 0.010% O (oxygen), not more than 0.020% N (nitrogen), and not more than 0.0030% B, the contents of said elements satisfying the formula (1) defined by:

$$(O\ (oxygen)+2S)/(0.27Y+0.035Zr+0.16REM) \leq 2.0 \qquad 1),$$

wherein REM is the content of rare earth metals, and wherein said steel has a hardness not more than 280 HV and fine grains of an average ferrite grain size number not less than ASTM No.2.

4. A steel as annealed for a separator of a solid oxide fuel cell, consisting essentially of, by mass:

not more than 0.1% C; from more than zero to less than 0.2% Si from more than zero to less than 0.2% Mn; 17 to 26% Cr; not more than 1% Ni; not less than 0.001 to less than 0.5% Al; 0.01 to 0.8% Zr; 0.005 to 0.1% La; and the balance being Fe and incidental impurities including not more than 0.1% Ti, not more than 0.015% S, not more than 0.010% O (oxygen), not more than 0.020% N (nitrogen), and not more than 0.0030% B, the contents of said elements satisfying the formula (1) defined by:

$$(O\ (oxygen)+2S)/(0.27Y+0.035Zr+0.16REM) \leq 2.0 \qquad 1),$$

wherein REM is the content of rare earth metals, and wherein said steel has a hardness not more than 280 HV and fine grains of an average ferrite grain size number not less than ASTM No.2.

5. A steel as annealed for a separator of a solid oxide type fuel cell, consisting essentially of, by mass:

not more than 0.08% C; from more than zero to less than 0.2% Si; from more than zero to less than 0.5% Mn; 18 to 25% Cr; not more than 0.5% Ni; not less than 0.001 to less than 0.5% Al; 0.005 to 0.1% La, 0.01 to 0.6% Zr; and the balance being Fe and incidental impurities including not more than 0.1% Ti, not more than 0.008% S, not more than 0.008% O (oxygen), not more than 0.020% N (nitrogen), and not more than 0.0020 B, the contents of said elements satisfying the formula (2) defined by $$(O\ (oxygen)+2S)/(0.27Y+0.035Zr+0.16REM) \leq 2.0 \qquad 2),$$

said steel having a hardness not more than 280 HV and fine grains of an average ferrite grain size number not less than ASTM No.2.

6. A steel as annealed for a separator of a solid oxide type fuel cell, consisting essentially of, by mass:

not more than 0.08% C; from more than zero to less than 0.2% Si; from more than zero to less than 0.5% Mn; 18 to 25% Cr; not more than 0.5% Ni; not less than 0.001 to less than 0.5% Al; 0.005 to 0.1% La, 0.01 to 0.6% Zr; and the balance being Fe and incidental impurities including not more than 0.1% Ti, not more than 0.008% S, not more than 0.008% O (oxygen), not more than 0.020% N (nitrogen), and not more than 0.0010 B, the contents of said elements satisfying the formula (2) defined by:

$$(O\ (oxygen)+2S)/(0.27Y+0.035Zr+0.16REM) \leq 2.0 \qquad 2),$$

said steel having a hardness not more than 280 HV and fine grains of an average ferrite grain size number not less than ASTM No.3.

7. A steel as annealed for a separator of a solid oxide fuel cell according to any one of claims 1 to 6, said steel further contains Mo alone or two kinds of Mo and W by an amount not more than 5.0% in terms of (Mo+½W).

8. A steel as annealed for a separator of a solid oxide fuel cell according to any one of claims 1 to 6, said steel further contains at least one kind of 0.01 to 1.0 in total selected from the group consisting of V, Nb, Ta, and Hf.

9. A steel as annealed for a separator of a solid oxide fuel cell according to any one of claims 1 to 6, said steel further contains: Mo alone or two kinds of Mo and W by an amount not more than 5.0% in terms of (Mo+½W); and at least one kind of 0.01 to 1.0 in total selected from the group consisting of V, Nb, Ta, and Hf.

10. A steel as annealed for a separator of a solid oxide fuel cell according to any one of claims 1 to 5, said steel having a 2 mm-V notch Charpy impact value not less than 8 J/cm$^2$.

11. A steel as annealed for a separator of a solid oxide fuel cell according to claim 7, said steel having a 2 mm-V notch Charpy impact value not less than 8 J/cm$^2$.

12. A steel as annealed for a separator of a solid oxide fuel cell according to claim 8, said steel having a 2 mm-V notch Charpy impact value not less than 8 J/cm$^2$.

13. A steel as annealed for a separator of a solid oxide fuel cell according to claim 9, said steel having a 2 mm-V notch Charpy impact value not less than 8 J/cm$^2$.

14. A steel as annealed for a separator of a solid oxide fuel cell according to claim 6, said steel having a 2 mm-V notch Charpy impact value not less than 10 J/cm$^2$.

15. A steel as annealed for a separator of a solid oxide fuel cell according to any one of claims 1 to 6, wherein the steel contains, by mass, 0.01 to 0.3% Y, and 0.005 to 0.1% in total of La and other rare earth metals.

* * * * *